United States Patent
Martin et al.

(10) Patent No.: US 8,695,916 B2
(45) Date of Patent: Apr. 15, 2014

(54) PERSONAL FLIGHT VEHICLE INCLUDING CONTROL SYSTEM

(75) Inventors: Glenn Neil Martin, Christchurch (NZ); Colin Cecil Dodge, Canterbury (NZ); Mark John Daniel, Christichurch (NZ)

(73) Assignee: Martin Aircraft Company Limited, Christchurch (NZ)

( * ) Notice: Subject to any disclaimer, the term of this patent is extended or adjusted under 35 U.S.C. 154(b) by 377 days.

(21) Appl. No.: 13/001,319

(22) PCT Filed: May 13, 2009

(86) PCT No.: PCT/NZ2009/000075
§ 371 (c)(1), (2), (4) Date: Jan. 27, 2011

(87) PCT Pub. No.: WO2009/157781
PCT Pub. Date: Dec. 30, 2009

(65) Prior Publication Data
US 2011/0133037 A1  Jun. 9, 2011

(30) Foreign Application Priority Data

Jun. 27, 2008 (NZ) ......................................... 569454

(51) Int. Cl.
*B64C 39/02* (2006.01)
*B64C 29/00* (2006.01)

(52) U.S. Cl.
USPC ...................................................... 244/4 A

(58) Field of Classification Search
USPC ............................ 244/2, 4 A, 23 R, 23 A, 903
See application file for complete search history.

(56) References Cited

U.S. PATENT DOCUMENTS

| | | | |
|---|---|---|---|
| 2,417,896 A | 3/1947 | Zimmerman | |
| 2,461,347 A | 2/1949 | Pentecost | |
| 2,955,780 A | 10/1960 | Hulbert | |
| 3,023,980 A | 3/1962 | Martin et al. | |
| 3,063,655 A | 11/1962 | Skavinsky | |
| 3,149,799 A | 9/1964 | Hulbert | |
| 3,173,629 A | 3/1965 | Uhor | |

(Continued)

FOREIGN PATENT DOCUMENTS

| CN | 2320533 Y | 5/1999 |
|---|---|---|
| CN | 101132966 A | 2/2008 |

(Continued)

OTHER PUBLICATIONS

International Search Report, dated Aug. 19, 2009, corresponding to PCT/NZ2009/000075, 3 pages.

(Continued)

*Primary Examiner* — Joseph W Sanderson
(74) *Attorney, Agent, or Firm* — Christie, Parker & Hale, LLP

(57) ABSTRACT

A personal flight device includes a housing securable to the pilot. The device includes at least one pair of ducted fans, one fan of each pair mounted to each side of the housing. The axis of rotation of each fan is fixed relative to the housing. At least one engine is mounted on the housing for driving the fans and both fans rotate in the same direction for producing thrust. Three pairs of control surfaces, with one control surface of each pair is mounted below each fan of the one or each pair of fans.

27 Claims, 9 Drawing Sheets

(56) References Cited

U.S. PATENT DOCUMENTS

| | | | |
|---|---|---|---|
| 3,184,183 A | 5/1965 | Piasecki | |
| 3,265,329 A | 8/1966 | Postelson | |
| 3,474,987 A | 10/1969 | Meditz | |
| 3,494,575 A | 2/1970 | Budworth | |
| 3,556,438 A | 1/1971 | Meditz | |
| 3,994,453 A | 11/1976 | Firestone | |
| 4,272,041 A | 6/1981 | Mabuchi et al. | |
| 4,379,532 A | 4/1983 | Dmitrowsky | |
| 4,575,341 A | 3/1986 | Bryant et al. | |
| 5,505,407 A | 4/1996 | Chiappetta | |
| 5,779,188 A * | 7/1998 | Frick | 244/4 A |
| 6,293,492 B1 | 9/2001 | Yanagisawa | |
| 6,353,789 B1 | 3/2002 | Hanson | |
| 6,464,166 B1 | 10/2002 | Yoeli | |
| 6,488,232 B2 | 12/2002 | Moshier | |
| 6,488,504 B1 | 12/2002 | Patterson | |
| 6,708,920 B2 | 3/2004 | Fukuyama | |
| 6,817,570 B2 | 11/2004 | Yoeli | |
| 6,824,095 B2 | 11/2004 | Mao | |
| 6,848,649 B2 | 2/2005 | Churchman | |
| 6,854,686 B2 | 2/2005 | Perlo et al. | |
| 7,188,803 B2 | 3/2007 | Ishiba | |
| 7,484,687 B2 * | 2/2009 | Martin | 244/4 A |
| 2002/0104919 A1 | 8/2002 | Geranio et al. | |
| 2002/0104921 A1 | 8/2002 | Louvel | |
| 2002/0113165 A1 | 8/2002 | Moshier | |
| 2005/0178879 A1 | 8/2005 | Mao | |
| 2006/0057544 A1 | 3/2006 | Bond | |
| 2006/0196991 A1 | 9/2006 | Martin | |
| 2011/0139939 A1 * | 6/2011 | Martin et al. | 244/23 A |

FOREIGN PATENT DOCUMENTS

| | | |
|---|---|---|
| DE | 2021043 | 11/1971 |
| DE | 2552888 | 6/1977 |
| DE | 4302791 | 8/1994 |
| FR | 2667568 | 4/1992 |
| GB | 268279 | 7/1923 |
| GB | 900095 | 7/1962 |
| JP | 45-36631 | 11/1970 |
| RU | 2135393 C | 8/1999 |
| WO | WO 00/35751 A | 6/2000 |
| WO | WO 02/47978 A2 | 6/2002 |
| WO | WO 2006/093420 A1 | 9/2006 |

OTHER PUBLICATIONS

International Preliminary Report on Patentability, dated May 3, 2010, corresponding to PCT/NZ2009/000075, 9 pages.
Office action issued from the State Intellectual Property Office of China dated Nov. 16, 2012, for CN Application No. 200980124431.6; 11 pages.
Office action issued from the Canadian Intellectual Property Office dated Dec. 6, 2012, for Canadian Application No. 2,731,206; 2 pages.
Office action issued from the Eurasian Patent Office dated Dec. 11, 2012 for EA Application No. 201100118/31; 3 pages.
PCT International Search Report dated Apr. 11, 2006 for PCT Application PCT/NZ2006/000029.
Pike, John, H-21 Shawnee, Global Security.org, Aug. 15, 2004, http://web.archive.org/web/20040815133402/http://www.globalsecurity.org/military/systems/aircraft/h-21.htm, 2 pages.
Van Aken, Scott, Fonderie Miniature, 1/48 Piasecki H-21, Aug. 4, 2004, Modelingmadness.com, http://web.archive.org/web/20040804093536/http://www.modelingmadness.com/scotts/korean/fmh2lpreview.htm, 3 pages.
US Army, Shawnees Over South Vietnam 1962, 1962, Available at Wikipedia.org., http/upload.wikimedia.org/wikipedia/en/0/03/Shawnees_over_south_vietnam_1962.gif, 1 page.
CH-47 Chinook, Wikipedia, edited Oct. 13, 2004, http://en.wikipedia.org/w/index.php?title=CH-47_Chinook&oldid=7080365, 3 pages.
Roddenberry, Gene; USS Enterprise NCC-1701-D captain's chair, Star Trek: The Next Generation, aired 1987-1994, Paramount Television, Image available at Star Trek Wiki, http://memory-alpha.org/en/wiki/image:enterprisedcommandchair.jpg, 1 page.
Notification of Reasons for Refusal dated Aug. 6, 2013, for Japanese Patent Application No. 2011-516194, with English translation.

* cited by examiner

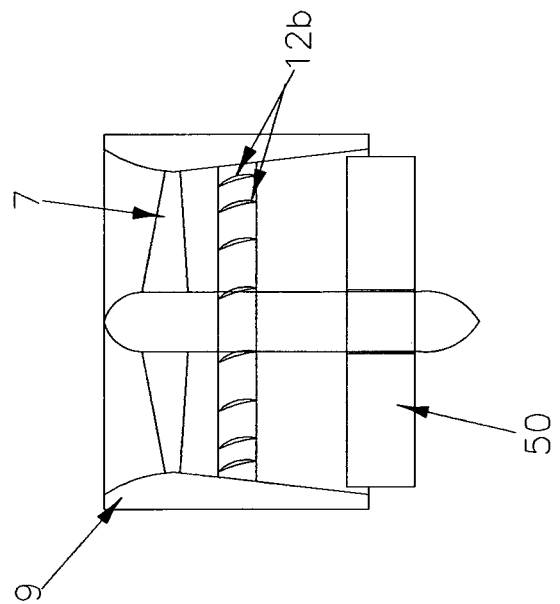
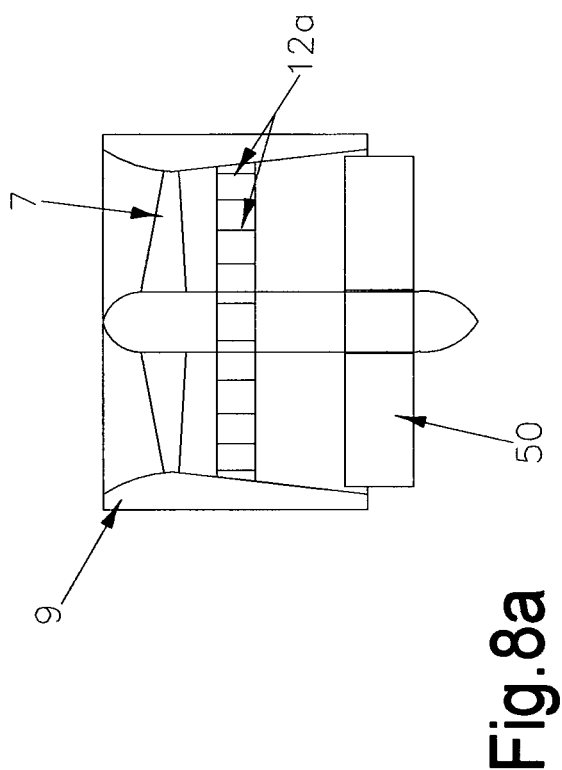

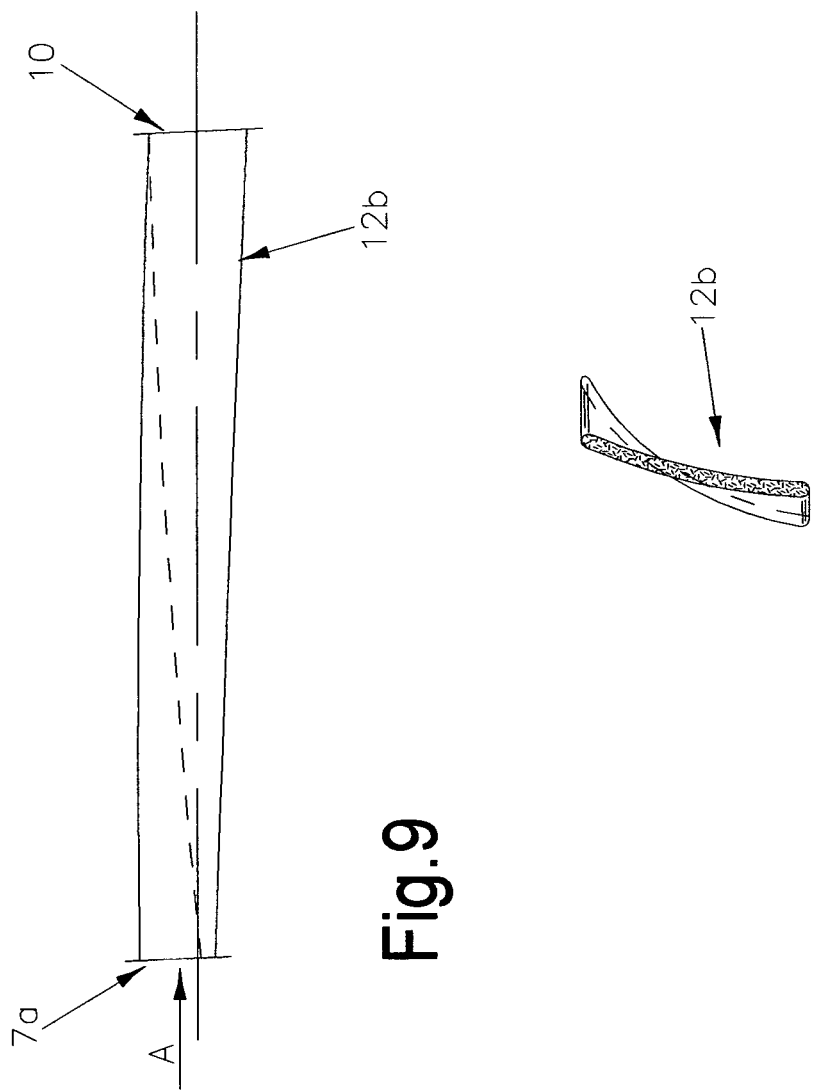

PERSONAL FLIGHT VEHICLE INCLUDING CONTROL SYSTEM

CROSS-REFERENCE TO RELATED APPLICATION

This application is a National Phase Patent Application and claims the priority of International Application Number PCT/NZ2009/000075, filed on May 13, 2009, which claims priority of New Zealand Patent Application Number 569454, filed on Jun. 27, 2008.

FIELD OF THE INVENTION

The present invention relates to a vertical take-off and landing personal flight device, i.e. a device which can be secured to the pilot rather like a jet belt, and which gives the pilot controllable powered flight.

BACKGROUND OF THE INVENTION

It should be noted that any discussion of the prior art throughout the specification is not an admission that such prior art is widely known or forms part of the common general knowledge in the field.

Personal flight devices were developed in the 1960's and 1970's, but were essentially rocket based devices (jet belts) which gave extremely short flight times (typically about 26 seconds) and were difficult to control. Further, these devices were fuelled by rocket fuel which is intrinsically dangerous.

In a related type of device fuel is fed to a catalyst bed to produce hot gas which is distributed between two spaced counter-rotating turbines to generate vertical thrust from the turbine exhausts. The device is steered by shrouds or deflector rings pivoted to the base of each turbine.

More recently, a number of personal flight devices have been proposed which use ducted fans as their means of propulsion:—for example a device which includes a pair of ducted fans and which is steered by tilting the ducted fans relative to the pilot.

A broadly similar type of design has been proposed, using shrouded propellers rather than ducted fans.

As the terms are used in this specification, the distinction between a 'shrouded propeller' and a 'ducted fan' essentially is that a ducted fan comprises one or more rotating aerofoils or fans (single or multi-bladed) mounted completely within a duct; the duct increases the overall efficiency of the fan. A shrouded propeller comprises a rotating aerofoil or propeller which is surrounded by a shroud, the only function of the shroud being to protect the propeller—the shroud does not appreciably affect the efficiency of the propeller.

A further proposal describes a device which includes a pair of ducted fans. In this device, the fans are rigidly secured to the supporting harness, and steering is achieved by control flaps mounted adjacent to the outlet of each fan. However, in this design the two fans are contra-rotating and thus have to be driven via a gearbox using a relatively complex rigid transmission system; this adds considerable weight to the device.

Other prior art proposals have been for single shrouded propellers or ducted fans. Single propeller/fan devices have the drawback that the propeller/fan has to be extremely large to provide adequate lift, and to balance the devices the pilot generally has the propeller/fan above or below him, which is far from ideal from a safety point of view. A further drawback is that the thrust from a single propeller/fan has to be split in some way to give steering and this tends to result in high frictional losses in the steering tubes or ducts.

SUMMARY OF INVENTION

An object of the present invention is a personal flight device which overcomes the disadvantages of the prior art devices described above, and which provides a lightweight yet powerful personal flight device which is comparatively safe to use.

The present invention provides a personal flight device which includes:
  a housing which is securable to the pilot;
  at least one pair of ducted fans, one fan of the pair mounted to one side of the housing, and the other fan of the pair mounted to the other side of the housing;
  wherein each fan rotates about an axis of rotation so as to draw air through the corresponding duct from an entry end of the duct to an exit end of the duct;
  and wherein the axis of rotation of each fan is fixed relative to the housing;
  at least one engine mounted on the housing for driving the fans, wherein both fans rotate in the same direction for producing thrust;
  three pairs of control surfaces, with one control surface of each pair mounted below one fan of the one or each pair of fans, and the other control surface of each pair being mounted below the other fan of the or each pair of fans, such that air leaving said fan impact on said control surface;
  one pair of control surfaces being configured to control yaw, one pair of control surfaces being configured to control pitch, and one pair of control surfaces being configured to control roll;
  control means for controlling the orientation of said control surfaces relative to said fans.

It is envisaged that the device probably would use only a single engine and a single pair of fans, since it is important for most applications to keep the overall weight of the device as low as possible. However, it would be possible to use more than one pair of fans, each pair driven by its own engine or both/all pairs driven by a single engine. If more than one pair of fans is used, then, depending upon how the fans are arranged, each fan may have a separate set of control surfaces (for yaw, pitch and roll) or, if the fans are arranged so that air leaving both or all of the fans on one side of the housing impacts upon a single area (for example if the sets of fans are stacked vertically on each side of the housing) than a single set of control surfaces may be used on each side of the housing. Preferably, the housing is securable to a pilot by means of a harness, and includes protective shielding between the pilot and the engine and fans.

The engine may be any suitable reliable, robust, lightweight engine e.g. a two-stroke or a four-stroke internal combustion engine, rotary engine, or a gas turbine.

The drive means may be any reliable lightweight drive means e.g. a chain drive, a fluid drive or a belt drive. Preferably, the drive means is a flexible belt drive, most preferably a toothed belt drive or a micro-V belt drive. A belt drive is preferred because a belt drive may easily be inspected by a pilot to check for wear or damage, and modern belt drives give a low-weight high-efficiency drive. For additional security, two or more drive means may be used in parallel.

Preferably, each of the or each pair of control surfaces configured to control yaw is mounted diametrically across the exit end of each duct, being configured to be pivotable about an axis substantially perpendicular to the axis of rotation of the corresponding fan, such that movement of said yaw control surfaces by said control means yaws the device.

Preferably also, each of the or each pair of control surfaces configured to control pitch is mounted below the exit end of the corresponding duct, being supported such that in a neutral position when no steering control is applied by said control means, each said control surface lies in a substantially vertical plane; each said control surface being configured to be pivoted about an axis substantially perpendicular to the longitudinal axis of the corresponding fan, such that movement of said pitch control surfaces by said control means pitches the device.

Preferably also, each of the or each pair of control surfaces configured to control roll is mounted below the exit end of the corresponding duct, each said control surface being configured to be pivoted about an axis substantially perpendicular to the longitudinal axis of the corresponding fan, such that movement of said roll control surfaces by said control means rolls the device.

Most preferably, each of the or each pair of control surfaces configured to control roll is mounted below the exit end of the corresponding duct, with each said control surface being formed as two co-planar vanes mounted one on each side of the corresponding pitch control surface; each said roll control surface being configured to be pivoted about an axis substantially perpendicular to the longitudinal axis of the corresponding fan and substantially perpendicular to the pivot axis of the corresponding pitch control surface, such that movement of said roll control surfaces by said control means rolls the device.

BRIEF DESCRIPTION OF THE DRAWINGS

By way of example only, a preferred embodiment of the present invention is described in detail with reference to the accompanying drawings in which:

FIGS. 8a and b are diagrams of two different versions of stators;
FIG. 9 is a plan view of a stator of FIG. 8b on a larger scale;
FIG. 10 is a view in the direction of Arrow A of FIG. 9.

DETAILED DESCRIPTION OF THE INVENTION

Figure 1:
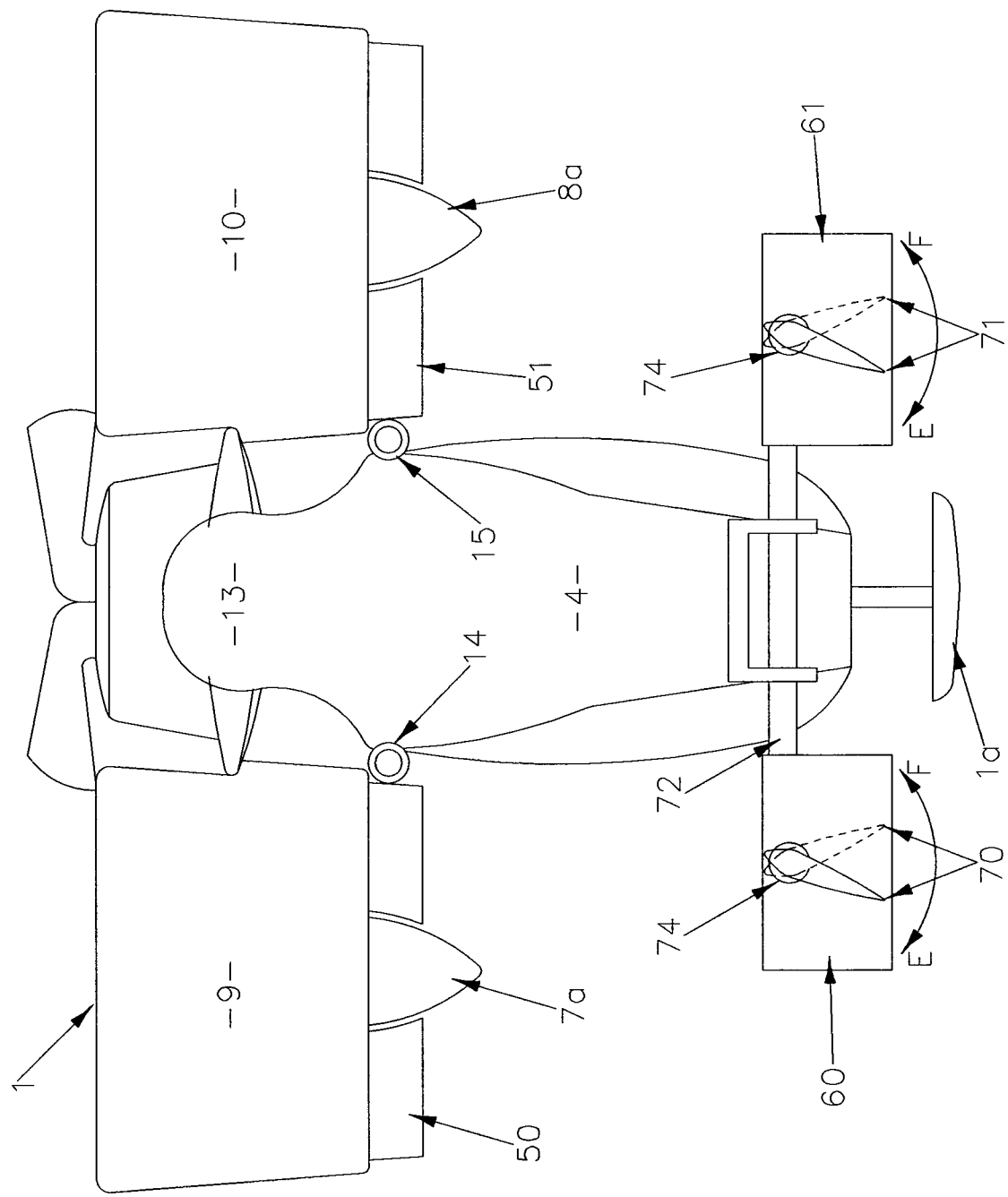
FIG. 1 is a diagrammatic front view of a device in accordance with the present invention.

Referring to the drawings, a personal flight device 1 includes a pair of ducted fans 2,3 which are supported and spaced apart by a central housing 4, which also supports an engine 6 and a fuel tank (not visible).

The ducted fans 2,3 are of known design and consist of a central multi-blade fan 7,8 mounted on, and rotatable with, a hub 7a,8a, inside a concentric cylindrical duct 9,10. The ducts 9,10 are rigidly mounted on the housing 4 by mounting brackets 4a (visible in FIG. 2 only) and are oriented such that in the "at rest" position shown in FIGS. 1 and 3, (i.e. when the device is resting on the ground) the axis of rotation of each fan is substantially vertical. The ends of the ducts 9,10 are depicted as open, but may in fact be covered by a protective grill or mesh.

Figure 4:
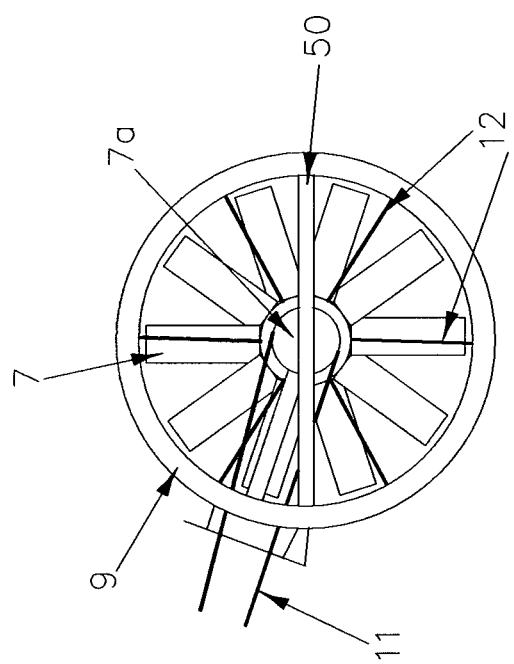
FIG. 4 is a view of one ducted fan from below.
Figure 6:
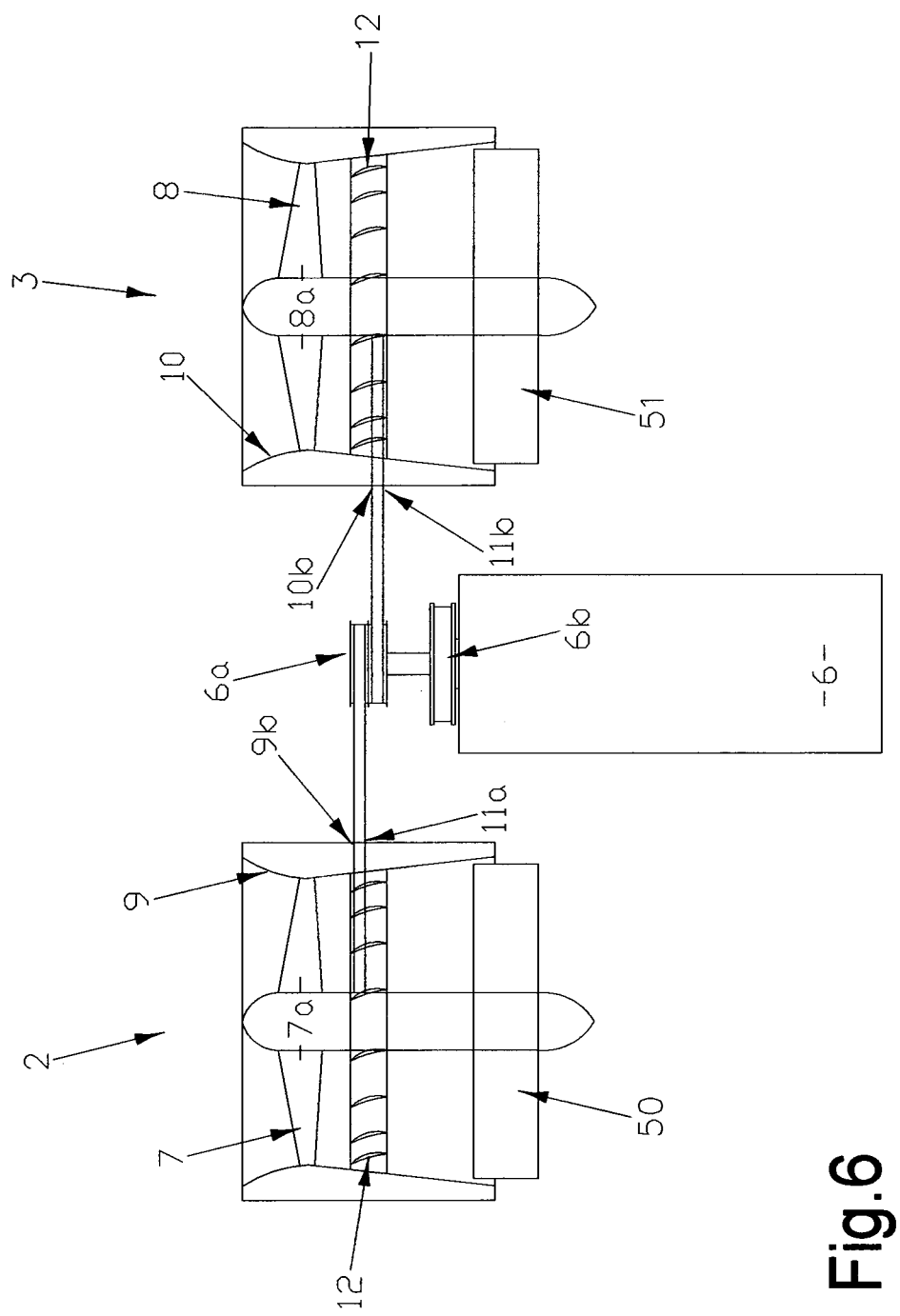
FIG. 6 is a diagram of the drive arrangement.

The fans 7,8 are driven from the engine 6 by a drive means in the form of a pair of toothed drive belts 11a,11b to the corresponding hub 7a,8a. The toothed belt drive is shown (diagrammatically) in FIGS. 4 and 6. As shown in FIG. 6, the engine 6 drives a drive pulley 6a through a flexible coupling 6b, to dampen torsional vibration from the engine 6. Two drive belts 11a,11b are engaged with the drive pulley 6a, one belt alongside the other.

The first drive belt 11a passes around the pulley 6a, through an aperture 9b in the duct 9 and around the hub 7a to drive the fan 7. The second drive belt 11b passes around the pulley 6a, through an aperture 10b in the duct 10, and around the hub 8a to drive the fan 8. In use, both fans 7,8 are rotated in the same direction, but the airflow from the bottom 9a,10a, of each duct 9,10 is made linear (i.e. substantially parallel to the longitudinal axis of the corresponding fan) by the use of a row of stators 12. The stators 12 are spaced, and extend radially around the inner circumference of each duct 9,10 below the corresponding fan 7,8. Each stator 12 is a 'spoke' which extends radially from the inner wall of the duct towards the hub.

FIG. 8a shows the simplest arrangement of stators, in which each stator is a flat parallel-sided plate, with the length of each plate extending radially from the inner wall of the duct towards the hub.

FIGS. 8b,9 and 10 illustrate a more aerodynamically efficient design of stator 12b, in which each stator 12b is a curved aerofoil cross-section plate, one end of which is secured to the inner wall of the duct and the other end of which is secured to the hub. As shown in FIGS. 9 and 10, each stator 12b twists along its longitudinal axis from the hub to the duct. Stators of this design have a higher efficiency than the simple flat stators 12a, but are more expensive to produce and to fit.

The housing 4 is slightly wider than the shoulder width of the pilot, and approximately the same height as the pilot. In the "at rest" position shown in FIGS. 1 and 3 of the drawings, the device rests on a support 1a which may be of any suitable type.

Figure 2:
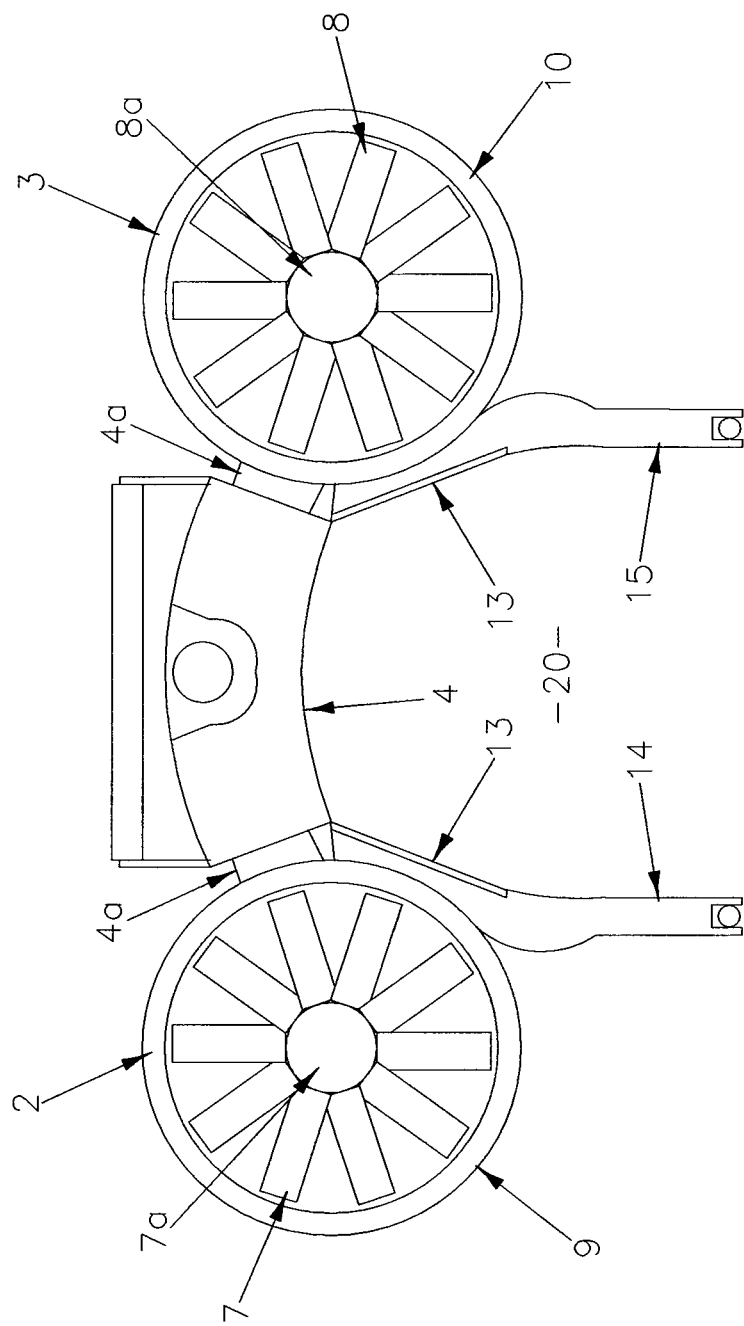
FIG. 2 is a plan view from above of the device of FIG. 1.

The housing 4 provides head shields 13 and armrests 14,15 (FIGS. 1 and 2).

The device is provided with controls for controlling yaw, pitch and roll; all of these controls can be operated by the pilot by means of control handles built into the armrests, as described below.

Figure 5:
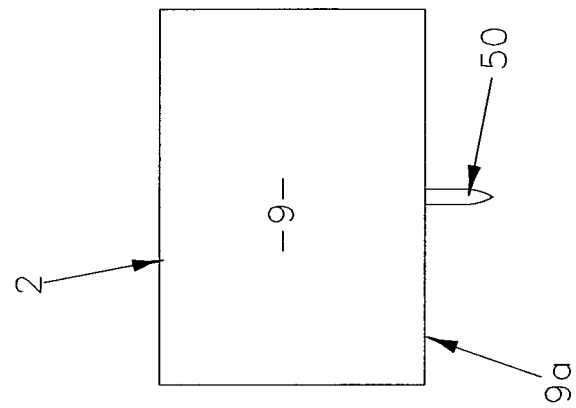
FIG. 5 is a side view of the fan of FIG. 4.

Yaw is the angular rotation of the device about a vertical axis; this is controlled by a pair of control vanes 50,51, one vane in each pair being mounted diametrically across the exit end of each of the ducts 9,10, and arranged to pivot about an axis substantially perpendicular to the axis of rotation of the corresponding fan and hub. Each vane 50,51 has an aerofoil cross-section. Each vane projects partly below the lower edge of the corresponding duct, as shown in FIGS. 5 and 6, and is made in two sections, one section lying on each side of the lower part of the hub. The two sections of each vane move together as a single unit.

Figure 7:
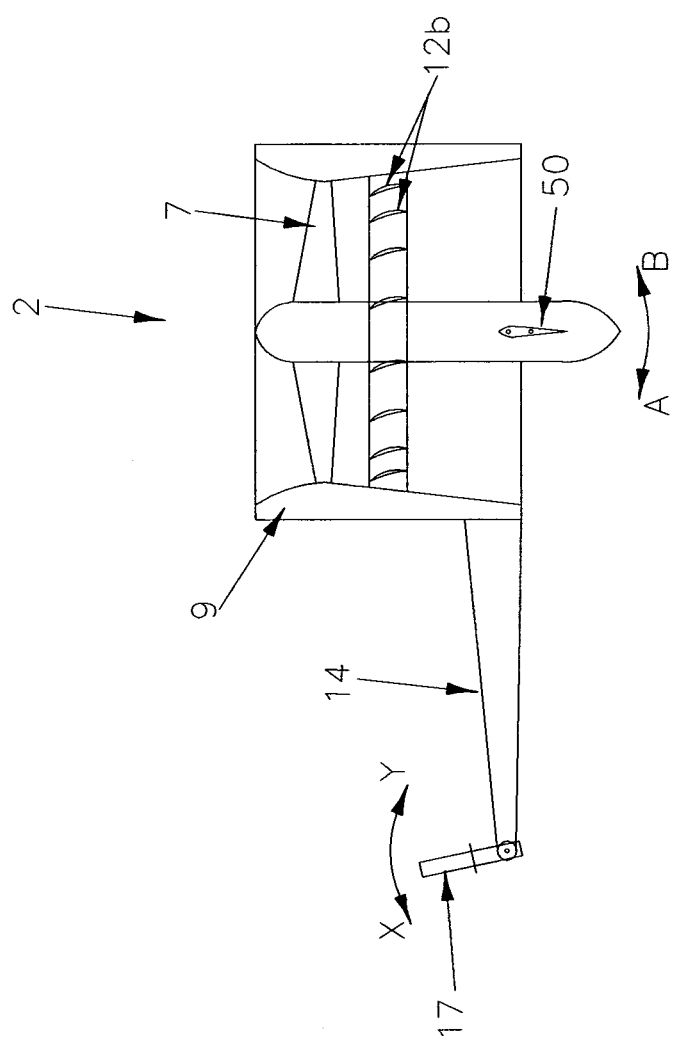
FIG. 7 is a diagram of part of the control system.
Figure 11:
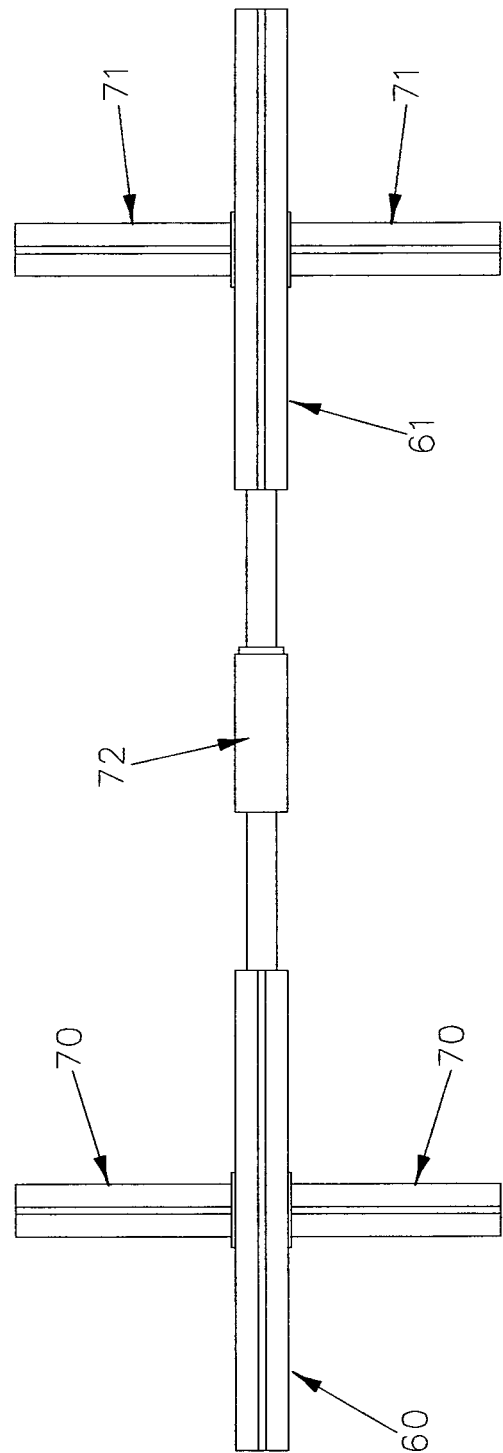
FIG. 11 is a plan view from above of one set of pitch/roll controls.

The control vanes 50,51 can be moved by cables (not shown) connected to a control lever 17 mounted on the corresponding armrest 14 (FIG. 7). Alternatively, a nonmechanical control system can be used, using, e.g. an electric actuator controlled by movement of the control lever to move the control vanes. The control system is always set so that the movement of one control vane 50 in one direction (e.g. the direction indicated by Arrow A in FIG. 7) produces an equal movement of the control vane 51 in the opposite direction (e.g. the direction indicated by Arrow B in FIG. 7):—this movement would yaw the device to the left; moving the vanes in the opposite direction would yaw the device to the right. The extent to which the control vanes are moved governs the degree of yaw.

Figure 3:
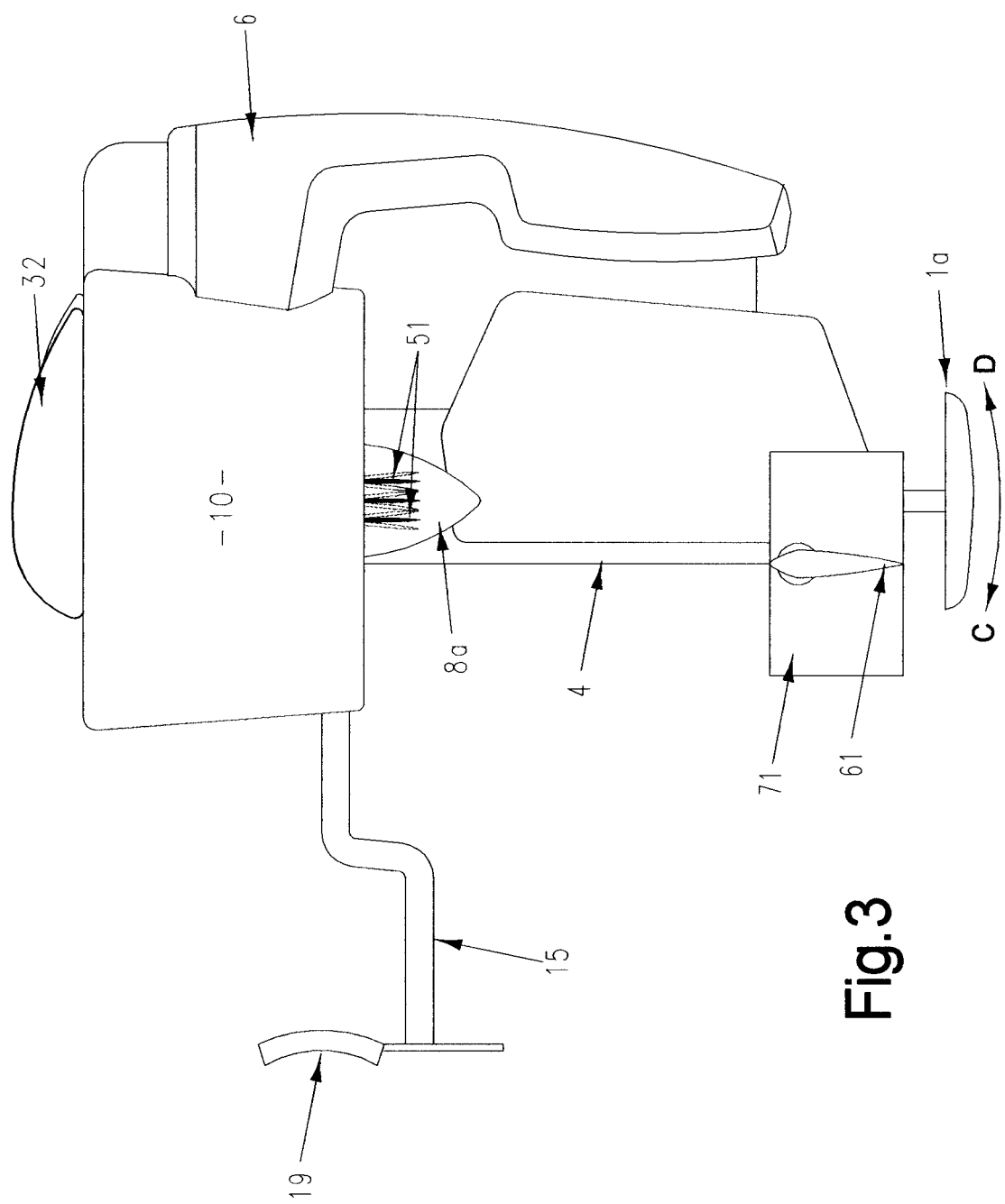
FIG. 3 is a side view of the device of FIG. 1.

FIGS. 1 and 7 show a single pair of control vanes 50, 51, but it also is possible to use multiple pairs of control vanes 50, 51, mounted in parallel as shown in FIG. 3. The multiple pairs of vanes are used in the same manner as the single pair of vanes.

Pitch and roll are governed by aerofoil-cross-section control surfaces 60/61 and 70/71 respectively. Pitch is the angular motion of the device in a vertical plane about a lateral axis; roll is the revolution of the device about a horizontal axis. From the point of view of the pilot of the device, yaw is swinging from side to side about a vertical axis, roll is leaning to one side or the other in a vertical plane, and pitch is leaning forwards or leaning backwards.

The control surfaces 60/61 and 70/71 are arranged as two sets of control surfaces in a cruciform configuration, with one set 60/70 on one side of the housing and the other set 61/71 on the other side of the housing. Both sets of control surfaces are supported by a support beam 72 which extends at right angles to the longitudinal axis of the device and is mounted across the lower portion of the housing, so that one set of control surfaces lies below the exit end of one duct, and the other set lies below the exit end of the other duct.

The control surfaces 60/61 which govern pitch are mounted on the support beam 72, with the longitudinal axis of the surface parallel to that of the support beam 72, and in the neutral position lie in a substantially vertical plane. The control surfaces 60/61 are moved by pivoting the support beam 72 in its bearings (not shown); this movement moves the lower end of the surfaces 60/61 in the directions indicated by the arrows C and D (FIG. 3). If the control surfaces 60/61 move in the direction of Arrow C, the air coming from the exit ends of the ducts 9,10 tends to pitch the device as shown in FIG. 3 anticlockwise. If the control surfaces 60/61 move in the direction of Arrow D, the device as shown in FIG. 3 is pitched clockwise.

Because of the cruciform arrangement of the control surfaces, surfaces 70/71 move with the surfaces 60/61, but in the pitching movement described in the preceding paragraph, the surfaces 70/71 remain at a constant angle to the airflow from the ducts and thus do not alter the orientation of the device.

The control surfaces 70/71 are each constructed as two equal parts, one on each side of the corresponding surface 60,61. The control surfaces 70/71 can pivot relative to the corresponding surfaces 60/61 as shown in broken lines in FIG. 1; this pivoting movement is controlled by a control rod 73 which moves the control surfaces 70/71 on bearings 74 mounted on the surfaces 60/61. To roll the device to the left, the control surfaces 70,71 are pivoted in the direction of Arrow E (FIG. 1); to roll the device to the right, the control surfaces 70/71 are pivoted in the direction of Arrow F.

The movements of the control surfaces 60/61, 70/71 are controlled by movements of the control handle 19, mounted on the armrest 15;

The armrest 14 also incorporates a twist grip throttle which is connected to the engine 6 and is used to control the acceleration of the engine in known manner.

Movements of all of the control surfaces 50/51, 60/61 and 70/71, as well as movement of the throttle, may be by means of control cables or rods or using electronic actuators to operate any of a wide range of known hydraulic or electrical servos to act on the control surfaces/throttle. The controls/throttle may be manually controlled by the pilot, or may be remotely controlled via an interface with a microcomputer (the so-called "fly by wire" system). Another possibility is for the device to be primarily manually controlled, but with a safety override provided by computer control, so that if the device is at an unsafe attitude or speed, the override automatically cuts in.

In use, the pilot stands in the space 20 (FIG. 2) and is strapped to the device by means of a parachute type a harness (not shown) which is mounted on the housing 4. Once strapped in, the pilot starts the engine 6 to rotate the fans 7,8 within the ducts 9,10 to give vertical lift to the device. The amount of lift is governed by the acceleration of the engine 6, which is controlled by the throttle. Pitch, roll and yaw are controlled as described above.

Rotating both fans 7,8 in the same direction means that the fans can be driven directly from the engine and there is no need for a gearbox to alter the direction of drive. This saves a great deal of additional weight, and also eliminates a component which would need maintenance and be a possible source of failure. Rotating both fans in the same direction would impart torque to the device, making the device difficult or impossible to steer, were it not for the stators which render the airflow leaving the fans 2,3 substantially linear.

The device is fitted with a parachute (not shown) which in emergencies can be opened by the pilot to bring the device and the pilot together safely to the ground.

It is envisaged that the primary use of the above-described device would be a one-person transport. However, it would be possible to substitute any of a range of remote-control devices for the pilot, and to operate the device remotely.

The invention claimed is:

1. A personal flight device which includes:
   a housing which is securable to the pilot;
   at least one pair of ducted fans, one fan of each pair of fans mounted to one side of the housing, and the other fan of each pair of fans mounted to the other side of the housing;
   wherein each fan rotates about an axis of rotation so as to draw air through the corresponding duct from an entry end of the duct to an exit end of the duct;
   and wherein the axis of rotation of each fan is fixed relative to the housing;
   at least one engine mounted on the housing for driving the fans, wherein both or all fans rotate in the same direction for producing thrust;
   at least three pairs of control surfaces for at least one pair of the at least one pair of fans, with one control surface of each pair of control surfaces mounted below one fan of the at least one of the at least one pair of fans, and the other control surface of each pair of control surfaces being mounted below the other fan of the at least one of the at least one pair of fans, such that air leaving said fan impacts on said control surface;
   one pair of control surfaces of said at least three pairs of control surfaces being configured to control yaw, one pair of control surfaces of said at least three pairs of control surfaces being configured to control pitch, and one pair of control surfaces of said at least three pairs of control surfaces being configured to control roll; two of said at least three pairs of control surfaces being mounted external to, and spaced from, the ducts of a corresponding pair of fans, a third of said at least three pairs of control surfaces mounted to and across the exit end of the ducts of the corresponding pair of fans;
   control means for controlling the orientation of said control surfaces relative to said fans.

2. The personal flight device as claimed in claim 1 wherein each fan is secured to the housing such that the axis of rotation of each fan is substantially vertical when the device is secured to a pilot standing upright.

3. The personal flight device as claimed in claim 1 wherein the engine is selected from the group consisting of: two-stroke internal combustion engines, four stroke internal combustion engines, rotary engines, gas turbine engines.

4. The personal flight device as claimed in claim 1, further including a drive means arranged to be driven by the at least one engine, said drive means being configured to drive the at least one pair of fans.

5. The personal flight device as claimed in claim 4, wherein the drive means comprises a single drive.

6. The personal flight device as claimed in claim 4, wherein the drive means comprises a double drive.

7. The personal flight device as claimed in claim 5 or claim 27, wherein the drive means includes a drive selected from the group consisting of: chain drives, fluid drives, belt drives.

8. The personal flight device as claimed in claim 1, wherein the device further includes a set of stators arranged in each fan duct to straighten the airflow leaving that fan.

9. The personal flight device as claimed in claim 8, wherein the stators of each set have one end secured to an inner wall of the duct and another end secured to a hub of the fan within the duct.

10. The personal flight device as claimed in claim 9, wherein each stator has a curved aerofoil cross-section.

11. The personal flight device as claimed in claim 8, wherein each of the pair of control surfaces configured to control yaw is mounted diametrically across the exit end of a duct of the corresponding pair of fans and is configured to be pivotable about an axis substantially perpendicular to the axis of rotation of the corresponding fan, such that movement of said yaw control surfaces by said control means yaws the device.

12. The personal flight device as claimed in claim 1, or claim 11, wherein each of the pair of control surfaces configured to control roll is mounted below, and spaced from, the exit end of a duct of the corresponding pair of fans, each said control surface being configured to be pivoted about an axis substantially perpendicular to the longitudinal axis of the corresponding fan, such that movement of said roll control surfaces by said control means rolls the device.

13. The personal flight device as claimed in claim 12, wherein each of the said control surfaces is formed as a vane with an aerofoil cross-section.

14. The personal flight device as claimed in claim 11, wherein each of the said control surfaces is formed as a vane with an aerofoil cross-section.

15. The personal flight device as claimed in claim 1, wherein each of the pair of control surfaces configured to control yaw is mounted diametrically across the exit end of a duct of the corresponding pair of fans and is configured to be pivotable about an axis substantially perpendicular to the axis of rotation of the corresponding fan, such that movement of said yaw control surfaces by said control means yaws the device.

16. The personal flight device as claimed in claim 15, or claim 11, wherein each of the pair of control surfaces configured to control yaw is configured to be controlled by the control means such that movement of one said control surface in a first direction produces an equal movement of the other control surface in the opposite direction.

17. The personal flight device as claimed in claim 16, wherein each of the said control surfaces is formed as a vane with an aerofoil cross-section.

18. The personal flight device as claimed in claim 15, wherein each of the said control surfaces is formed as a vane with an aerofoil cross-section.

19. The personal flight device as claimed in claim 1, or claim 11, wherein each of the pair of control surfaces configured to control pitch is mounted below, and spaced from, the exit end of a duct of the corresponding pair of fans and is supported such that in a neutral position when no steering control is applied by said control means, each said control surface lies in a substantially vertical plane; each said control surface being configured to be pivoted about an axis substantially perpendicular to the longitudinal axis of the corresponding fan, such that movement of said pitch control surfaces by said control means pitches the device.

20. The personal flight device as claimed in claim 19, wherein each of the pair of control surfaces configured to control roll is mounted below, and spaced from, the exit end of the corresponding a duct of the corresponding pair of fans, each said control surface being configured to be pivoted about an axis substantially perpendicular to the longitudinal axis of the corresponding fan, such that movement of said roll control surfaces by said control means rolls the device.

21. The personal flight device as claimed in claim 20, wherein each of the said control surfaces is formed as a vane with an aerofoil cross-section.

22. The personal flight device as claimed in claim 19, wherein each of the pair of control surfaces configured to control roll is mounted below, and spaced from, the exit end of a duct of the corresponding pair of fans, with each said control surface being formed as two co-planar vanes mounted one on each side of the corresponding pitch control surface; each said roll control surface being configured to be pivoted about an axis substantially perpendicular to the longitudinal axis of the corresponding fan and substantially perpendicular to the pivot axis of the corresponding pitch control surface, such that movement of said roll control surfaces by said control means rolls the device.

23. The personal flight device as claimed in claim 22, wherein said pitch control surfaces and said roll control surfaces are mounted upon a support member which extends across the opposite end of said housing to the or each pair of fans.

24. The personal flight device as claimed in claim 19, wherein each of the said control surfaces is formed as a vane with an aerofoil cross-section.

25. The personal flight device as claimed in claim 1, wherein the housing further includes a mounting for a throttle control and controls for said control means.

26. The personal flight device as claimed in claim 1 wherein said control means is selected from the group consisting of mechanical control cables, electric actuators, and hydraulic actuators.

27. The personal flight device as claimed in claim 1 wherein the device includes only a single pair of ducted fans and a single engine.

* * * * *